(No Model.)
G. A. ROBERTS.
THRASHING MACHINE TOOTH.
No. 335,387. Patented Feb. 2, 1886.
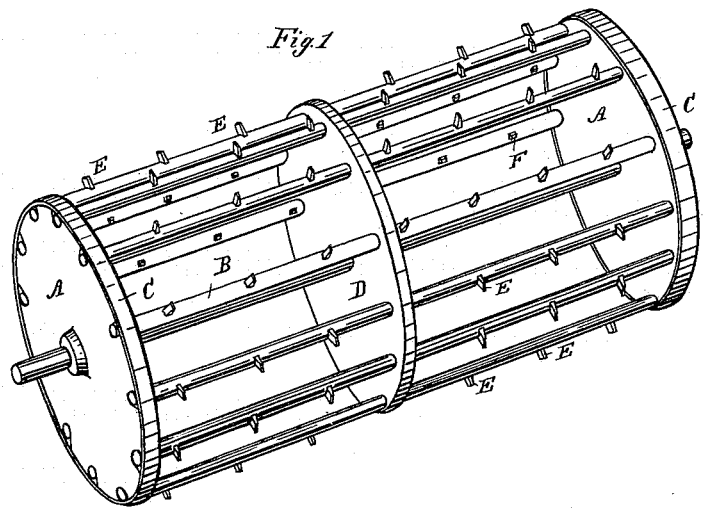
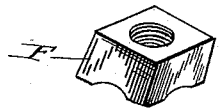
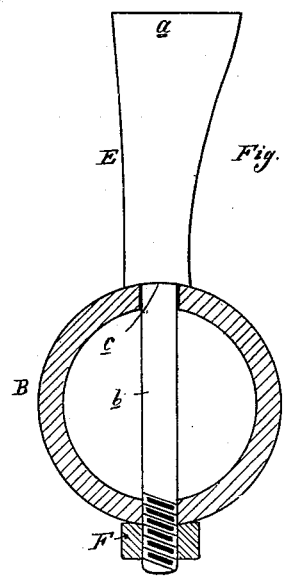
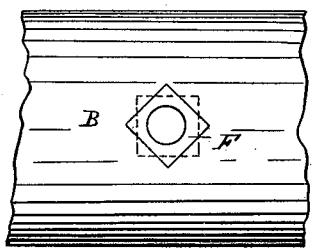
Attest:
John Schuman.
Inventor:
George A. Roberts.
by his Att'y
Tho. S. Sprague

United States Patent Office.

GEORGE A. ROBERTS, OF THREE RIVERS, MICHIGAN.

THRASHING-MACHINE TOOTH.

SPECIFICATION forming part of Letters Patent No. 335,387, dated February 2, 1886.

Application filed September 10, 1885. Serial No. 176,677. (No model.)

*To all whom it may concern:*

Be it known that I, GEORGE A. ROBERTS, of Three Rivers, in the county of St. Joseph and State of Michigan, have invented new and useful Improvements in Thrashing-Machine Teeth; and I do hereby declare that the following is a full, clear, and exact description thereof, reference being had to the accompanying drawings, which form a part of this specification.

This invention relates to certain new and useful improvements in the construction of thrashing-machine-cylinder teeth and the means of locking the same to the bars which form the cylinder against becoming loosened by vibrations or other similar causes.

The invention consists in the peculiar construction and combination of parts, as fully hereinafter described and claimed.

Figure 1 is a perspective view of a thrashing-cylinder composed of the proper heads and round bars secured between the heads to carry the teeth. Fig. 2 is a vertical cross-section through one of the bars, showing the method of securing the teeth. Fig. 3 is a plan on the nut side of the bar. Fig. 4 is a perspective view of the nut.

In the accompanying drawings, A represents the heads of a thrashing-machine cylinder, and B round bars of iron, the ends of which are inserted in recesses formed in the peripheries of the heads, and secured thereto by bands C shrunk thereon.

D is a strengthening diaphragm, which supports the centers of the bars to prevent their springing when in operation, and these bars may be solid or hollow, as preferred or desired.

E represents the teeth, each having a flat blade, *a*, and terminating in a shank, *b*, of sufficient length to pass through the bar B, the projecting end being provided with a suitable thread. At the intersection of the blade with the shank there is formed a concave shoulder, *c*, adapted to fit the curvature of the bar, against which it rests when in place. A nut, F, having a suitable thread, is employed to hold the tooth in place, and as the vibration of the cylinder when in operation has a tendency to loosen this nut it becomes a matter of great importance that some means be devised and employed to lock the nut in its position. In order to do this I make the inner face of the nut concave, so much so as nearly to fit the curvature of the bar. As the nut is screwed up and the tooth is brought home to its seat the nut will stand, as shown in Fig. 3, with two opposite corners in line, or nearly so, with the longitudinal axis of the bar, and in this position is not locked; but, turning the nut still further, until it stands square with the axis, it will be found to be perfectly locked in place. It may be said that this is impossible, and such appears to be the case on first glance; but the pitch of the thread upon the shank is a little greater than the degree of curvature of that portion of the bar covered by the nut, and it will readily be seen that what is lost by advancing the corners of the nut from the position shown in full lines in Fig. 3 until the nut is square with the axis of the bar, as shown in dotted lines, the lead of the thread upon the shank compensates for, and as the nut assumes this latter position the curvature of the inner face, which nearly fits the curvature of the bar, combined with the elasticity of the hollow bar, will prevent any vibrations or ordinary force from unscrewing it. To produce the best effect, the threads on the bolt and nut should bear such a proportion to the size of the bar and the curve of the face of the nut that the latter can be turned forward on the bolt from the position shown in full lines in Fig. 3 to that shown in dotted lines without causing a loosening of the same on the bar.

What I claim as my invention is—

The combination, in a thrashing-machine cylinder, of a round bar for carrying the teeth, a flat-bladed tooth having a shank and a concave shoulder, such shank being provided with a thread having a pitch or lead a little greater than the pitch of the curvature of the bar, and a concave-faced nut adapted to secure and lock such tooth in position, substantially as specified.

GEORGE A. ROBERTS.

Witnesses:
MARVIN H. BUMPHREY,
JOHN L. KEYPORT.